US012681769B2

(12) United States Patent
Zong et al.

(10) Patent No.: US 12,681,769 B2
(45) Date of Patent: Jul. 14, 2026

(54) CLOUD-BASED RESOURCE THROTTLING PREDICTION

(71) Applicant: Salesforce, Inc., San Francisco, CA (US)

(72) Inventors: Bo Zong, Bellevue, WA (US); Huan Wang, Fremont, CA (US); Tian Lan, San Francisco, CA (US); Ran Yao, San Francisco, CA (US); Tony Wong, San Francisco, CA (US); Daeki Cho, Kirkland, WA (US); Caiming Xiong, San Francisco, CA (US); Silvio Savarese, San Francisco, CA (US); Yingbo Zhou, Palo Alto, CA (US)

(73) Assignee: Salesforce, Inc., San Francisco, CA (US)

( * ) Notice: Subject to any disclaimer, the term of this patent is extended or adjusted under 35 U.S.C. 154(b) by 909 days.

(21) Appl. No.: 17/962,301

(22) Filed: Oct. 7, 2022

(65) Prior Publication Data

US 2024/0118937 A1 Apr. 11, 2024

(51) Int. Cl.
G06F 9/46 (2006.01)
G06F 9/50 (2006.01)

(52) U.S. Cl.
CPC .............. G06F 9/505 (2013.01); G06F 9/468 (2013.01); G06F 9/5072 (2013.01)

(58) Field of Classification Search
CPC ......... G06F 9/505; G06F 9/468; G06F 9/5072
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 5,983,227 | A | 11/1999 | Nazem et al. |
| 6,092,083 | A | 7/2000 | Brodersen et al. |
| 6,161,149 | A | 12/2000 | Achacoso et al. |
| 6,169,534 | B1 | 1/2001 | Raffel et al. |

(Continued)

FOREIGN PATENT DOCUMENTS

| | | |
|---|---|---|
| AU | 2018229500 B2 | 9/2018 |
| AU | 2021201242 A1 | 2/2021 |

(Continued)

*Primary Examiner* — Tammy E Lee
(74) *Attorney, Agent, or Firm* — Kowert, Hood, Munyon, Rankin & Goetzel, P.C.; Mark D. Seegers; Dean M. Munyon

(57) ABSTRACT

Embodiments herein relate to prediction, based on previous usage of a cloud-based computing resource by a user of one or more users of the cloud-based computing resource, future usage of the cloud-based computing resource. Based on the predicted future usage, embodiments relate to identifying that throttling of access to the cloud-based computing resource is to occur, and notifying the user of the throttling. Other embodiments may be described and/or claimed.

17 Claims, 7 Drawing Sheets

(56) References Cited

U.S. PATENT DOCUMENTS

| | | |
|---|---|---|
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,546,217 B2 | 1/2020 | Albright et al. |
| 10,565,493 B2 | 2/2020 | Merity et al. |
| 10,592,767 B2 | 3/2020 | Trott et al. |
| 10,747,761 B2 | 8/2020 | Zhong et al. |
| 10,783,875 B2 | 9/2020 | Hosseini-Asl et al. |
| 10,909,157 B2 | 2/2021 | Paulus et al. |
| 10,924,334 B1 | 2/2021 | Kumar et al. |
| 10,929,607 B2 | 2/2021 | Zhong et al. |
| 10,958,925 B2 | 3/2021 | Zhou et al. |
| 10,963,782 B2 | 3/2021 | Xiong et al. |
| 11,056,099 B2 | 7/2021 | Zhou et al. |
| 11,087,092 B2 | 8/2021 | Zheng et al. |
| 11,106,182 B2 | 8/2021 | Hosseinie-Asl et al. |
| 11,113,598 B2 | 9/2021 | Socher et al. |
| 11,170,287 B2 | 11/2021 | Zhong et al. |
| 11,194,450 B2 | 12/2021 | Kuo et al. |
| 11,222,253 B2 | 1/2022 | Hashimoto et al. |
| 11,227,218 B2 | 1/2022 | Min et al. |
| 11,416,688 B2 | 8/2022 | Wu et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |

(56) References Cited

U.S. PATENT DOCUMENTS

| | | | |
|---|---|---|---|
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |
| 2016/0350653 A1 | 12/2016 | Socher et al. |
| 2018/0336453 A1 | 11/2018 | Merity et al. |
| 2018/0373682 A1 | 12/2018 | McCann et al. |
| 2018/0373987 A1 | 12/2018 | Zhang et al. |
| 2019/0130312 A1 | 5/2019 | Xiong et al. |
| 2019/0130896 A1 | 5/2019 | Zhou et al. |
| 2019/0130897 A1 | 5/2019 | Zhou et al. |
| 2019/0251431 A1 | 8/2019 | Keskar et al. |
| 2019/0295530 A1 | 9/2019 | Hosseini-Asl et al. |
| 2019/0355270 A1 | 11/2019 | McCann et al. |
| 2019/0362246 A1 | 11/2019 | Lin et al. |
| 2020/0104643 A1 | 4/2020 | Hu et al. |
| 2020/0104699 A1 | 4/2020 | Zhou et al. |
| 2020/0272940 A1 | 8/2020 | Sun et al. |
| 2020/0302236 A1 | 9/2020 | Gao et al. |
| 2020/0364299 A1 | 11/2020 | Niu et al. |
| 2020/0372116 A1 | 11/2020 | Gao et al. |
| 2020/0372319 A1 | 11/2020 | Sun et al. |
| 2020/0372339 A1 | 11/2020 | Che et al. |
| 2020/0372341 A1 | 11/2020 | Asai et al. |
| 2021/0064431 A1* | 3/2021 | Smith .................. G06F 9/5077 |
| 2021/0089649 A1 | 3/2021 | Suramanyam et al. |
| 2021/0089882 A1 | 3/2021 | Sun et al. |
| 2021/0103561 A1 | 4/2021 | Obembe et al. |
| 2021/0141781 A1 | 5/2021 | Chadha et al. |
| 2021/0141865 A1 | 5/2021 | Machado et al. |
| 2021/0142103 A1 | 5/2021 | Xie et al. |
| 2021/0142164 A1 | 5/2021 | Liu et al. |
| 2021/0150340 A1 | 5/2021 | Liu et al. |
| 2021/0150366 A1 | 5/2021 | Ramachandran et al. |
| 2021/0152534 A1 | 5/2021 | Xie et al. |
| 2021/0174204 A1 | 6/2021 | Yin et al. |
| 2021/0216828 A1 | 7/2021 | Ramaiah et al. |
| 2021/0256370 A1 | 8/2021 | Ramachandran et al. |
| 2021/0319796 A1 | 10/2021 | Wang et al. |
| 2021/0343274 A1 | 11/2021 | Kang et al. |
| 2021/0357687 A1 | 11/2021 | Gao et al. |
| 2021/0374132 A1 | 12/2021 | Yang et al. |
| 2021/0374133 A1 | 12/2021 | Lin et al. |
| 2021/0374353 A1 | 12/2021 | Zhang et al. |
| 2021/0374524 A1 | 12/2021 | Feng et al. |
| 2021/0374603 A1 | 12/2021 | Xia et al. |
| 2021/0375269 A1 | 12/2021 | Yavuz et al. |
| 2021/0383212 A1 | 12/2021 | Ramachandran et al. |
| 2021/0397799 A1 | 12/2021 | Hashimoto et al. |
| 2022/0036884 A1 | 2/2022 | Ramachandran et al. |
| 2022/0044058 A1 | 2/2022 | Zhang et al. |
| 2022/0050877 A1 | 2/2022 | Kang et al. |
| 2022/0050966 A1 | 2/2022 | Yang et al. |
| 2022/0050968 A1 | 2/2022 | Xie et al. |
| 2022/0058348 A1 | 2/2022 | He et al. |
| 2022/0067534 A1 | 3/2022 | Bai et al. |
| 2022/0083819 A1 | 3/2022 | Chadha et al. |
| 2022/0101844 A1 | 3/2022 | Yang et al. |
| 2022/0103491 A1 | 3/2022 | Yang et al. |
| 2022/0108086 A1 | 4/2022 | Wu et al. |
| 2022/0129626 A1 | 4/2022 | Liu et al. |
| 2022/0129629 A1 | 4/2022 | Niu et al. |
| 2022/0139384 A1 | 5/2022 | Wu et al. |
| 2022/0171943 A1 | 6/2022 | Keskar et al. |
| 2022/0215195 A1 | 7/2022 | Gao et al. |
| 2022/0269946 A1 | 8/2022 | Zhou et al. |
| 2022/0277141 A1 | 9/2022 | Nijkamp et al. |
| 2022/0293094 A1 | 9/2022 | Mao et al. |
| 2022/0300761 A1 | 9/2022 | Zhang et al. |
| 2022/0417175 A1* | 12/2022 | Lemberg ................ G06F 9/505 |
| 2024/0103896 A1* | 3/2024 | Jiang ...................... G06F 16/21 |

FOREIGN PATENT DOCUMENTS

| | | | |
|---|---|---|---|
| EP | 3814865 B1 | 6/2022 |
| WO | WO 2018/094295 A1 | 5/2018 |
| WO | WO 2020/069020 A1 | 4/2020 |
| WO | WO 2020/069039 A1 | 4/2020 |
| WO | 3123198 C | 6/2020 |
| WO | WO 2022/035461 A1 | 2/2022 |
| WO | WO 2022/039902 A1 | 2/2022 |
| WO | WO 2022/071978 A1 | 4/2022 |
| WO | WO 2022/076676 A1 | 4/2022 |
| WO | WO 2022/173593 A1 | 8/2022 |

* cited by examiner

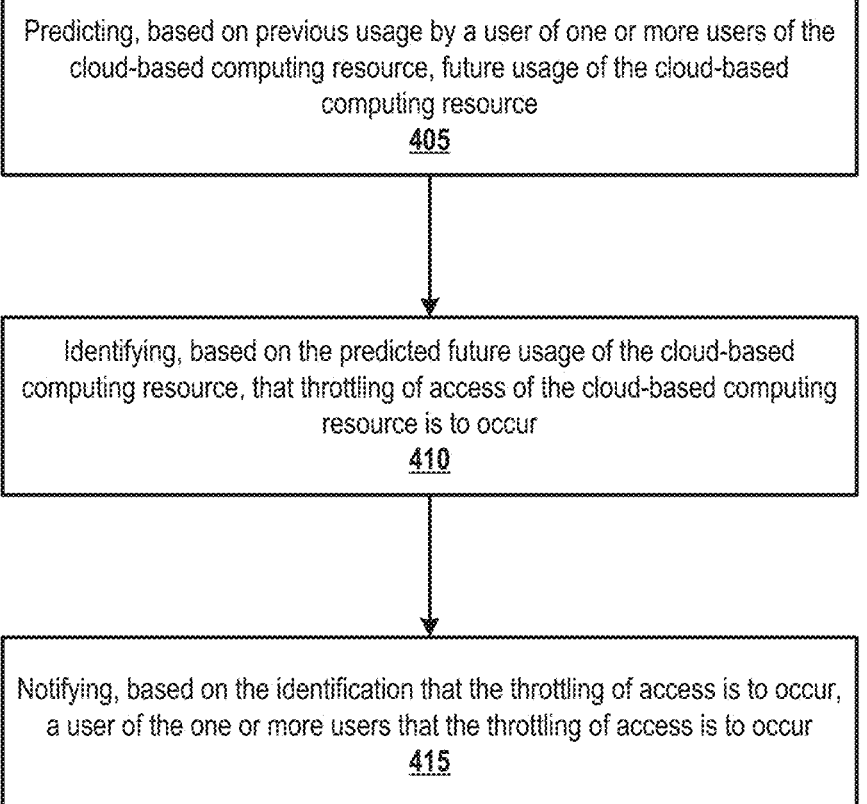

Predicting, based on previous usage by a user of one or more users of the cloud-based computing resource, future usage of the cloud-based computing resource
405

Identifying, based on the predicted future usage of the cloud-based computing resource, that throttling of access of the cloud-based computing resource is to occur
410

Notifying, based on the identification that the throttling of access is to occur, a user of the one or more users that the throttling of access is to occur
415

FIG. 4

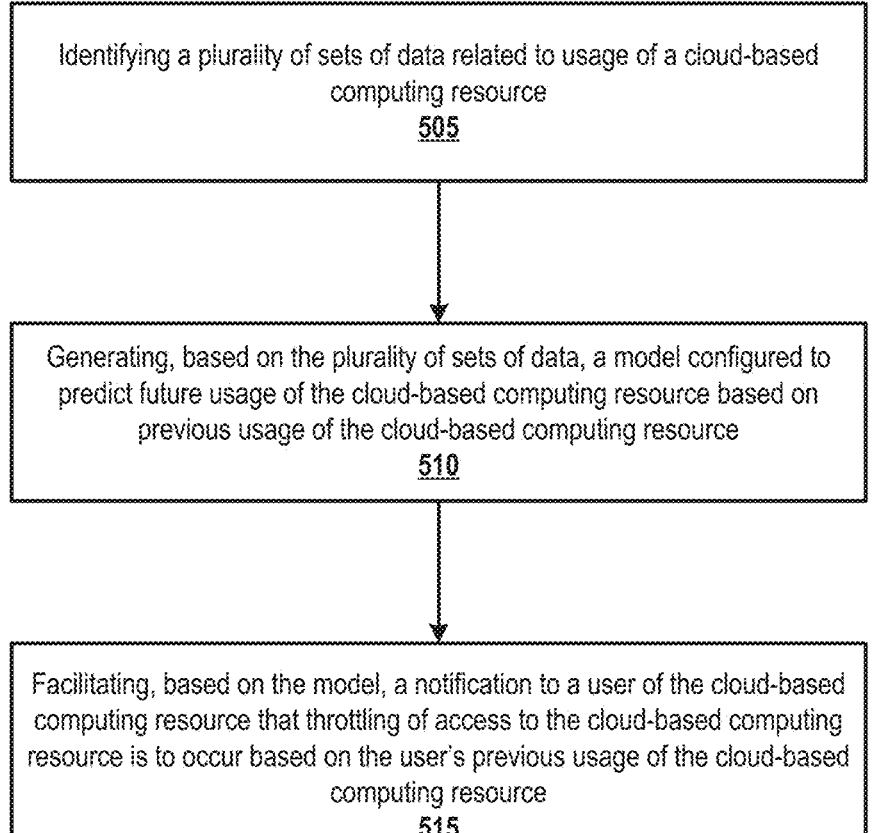

Identifying a plurality of sets of data related to usage of a cloud-based computing resource
505

Generating, based on the plurality of sets of data, a model configured to predict future usage of the cloud-based computing resource based on previous usage of the cloud-based computing resource
510

Facilitating, based on the model, a notification to a user of the cloud-based computing resource that throttling of access to the cloud-based computing resource is to occur based on the user's previous usage of the cloud-based computing resource
515

FIG. 5

Identifying, based on a prediction by a neural network of a user's predicted future level of usage of a resource of a DB server, that the user's access to the resource is to be throttled at a future time
605

Providing, to the user based on the identifying, an indication that the user's access to the resource is to be throttled at the future time
610

CLOUD-BASED RESOURCE THROTTLING PREDICTION

TECHNICAL FIELD

One or more implementations relate to the field of cloud-based resource throttling prediction; and more specifically, to predicting future throttling of a cloud-based database resource based on a user's current usage of the cloud-based database resource.

BACKGROUND ART

Cloud based resources (e.g., resources of a database (DB) server) may be accessed by a plurality of users. In the situation where one user is accessing a relatively high amount of the DB server resources, such access may negatively impact other users of the cloud based resources. In such cases, access to the resources may be throttled.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 4 depicts an example process related to a cloud-based resource, in accordance with various implementations.

FIG. 5 depicts an alternative example process related to a cloud-based resource, in accordance with various implementations.

DETAILED DESCRIPTION

The following description describes implementations for cloud-based resource throttling prediction. Specifically, implementations herein relate to predicting, based on current usage of a cloud-based resource (e.g., a resource of a DB server), that a user's access to the resource will be throttled. Based on the prediction, the user may then be notified of the throttling.

Figure 1:
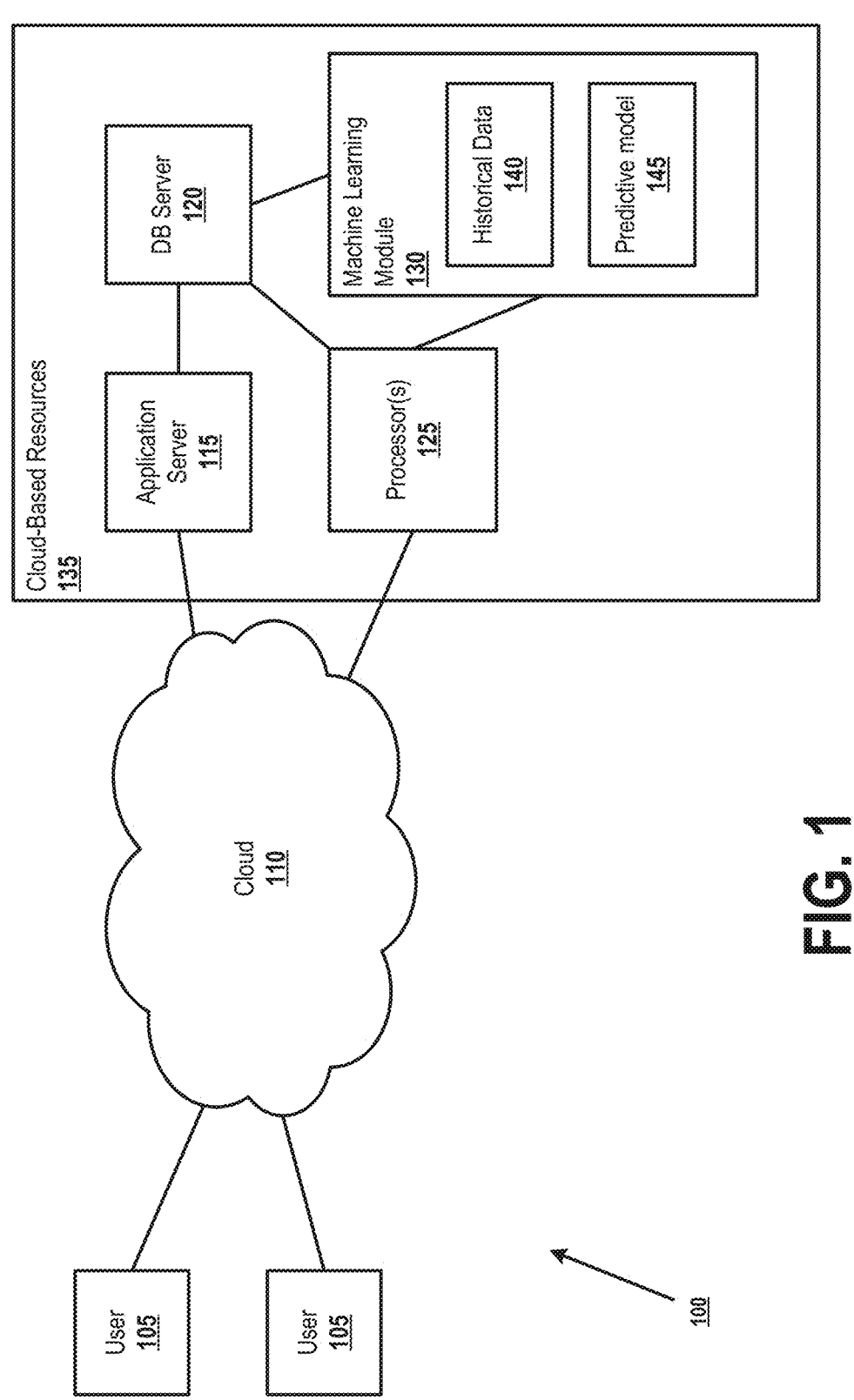
FIG. 1 is a simplified block diagram of a network that includes a cloud-based resource, in accordance with various implementations.

FIG. 1 is a simplified block diagram of a network 100 that includes a cloud-based resource, in accordance with various implementations. The network 100 may include a plurality of users 105. As used herein, a user 105 may refer an entity, individual, or group of individuals that is/are accessing a cloud-based computing resource. For example, a user 105 may be a single individual that is accessing the cloud-based computing resource through an internet-connected electronic device such as a laptop computer, a desktop computer, a cellular phone, a personal digital assistant (PDA), a tablet, or some other electronic device. Additionally or alternatively, a user 105 may refer to a grouping of a plurality of individual users. For example, a user 105 may be a school, a business, multi-unit housing, a corporation, etc. with a plurality of individuals that are accessing the cloud-based resource. In this use case, such individuals may be grouped according to one or more of a variety of parameters such as which floor they are on, which business unit they are assigned to, an internet protocol (IP) address, the entity (e.g., the business or school or building) with which they are associated, etc. It will be noted that, although only two users 105 are depicted in FIG. 1, in real-world implementations the network 100 may include only a single user or three-or-more users. The specific number of users may be based on, for example, network capacity, network bandwidth, user need, existing agreements between the entity with which the user is associated and an internet service provider (ISP), etc.

The user(s) 105 may be communicatively coupled with one or more cloud-based resources 135. As illustrated in FIG. 1, the user(s) 105 may be coupled with the resources 135 via a cloud connection 110. As used herein, the cloud connection 110 may refer to one or more wired or wireless communication techniques by which the user(s) 105 may communicate with the cloud-based resources 135. Such communication techniques may include, for example, WiFi, long term evolution (LTE), third generation (3G), fourth generation (4G), fifth generation (5G), new radio (NR), cellular communication, wired communication (e.g., over a fiberoptic cable or some other wired connection), and/or one or more other routers, base stations, wired elements, or some other electronic device that may be configured to pass electronic (i.e., data) signals between two electronic devices.

The cloud-based resources 135 may include a plurality of resources as shown in FIG. 1. It will be understood that the depiction in FIG. 1 of the types of resources, the number of resources, or their specific connections is presented herein as a highly simplified example for the sake of discussion. Real-world implementations may include significantly more (or, in some cases, fewer) resources, more complicated connections between the resources, etc. Additionally, it will be recognized that, in real-world implementations, various of the elements may be implemented as hardware, software, firmware, or some combination thereof. In some implementations, various of the elements (e.g., the processor(s) 125 and the machine learning module 130) may be part of the same logic, the same electronic device, etc., while in other implementations such cloud-based resources 135 may be physically separate from one another (in different electronic devices) and/or may be in different locations from one another.

The cloud-based resources 135 may include one or more resources an application server 115 that is coupled with a DB server 120. Such resources of the application server 115 may be or include one or more processing units (e.g., a processor, a processor core, memory, traffic control logic that parses, directs, or responds to requests from a user, and/or some other resource of the application server 115). Generally, the application server 115 may be a server that is configured to provide one or more services to the user(s) 105. Such services may be operation of one or more applications.

The application server 115 may be communicatively coupled with one or more DB servers 120. The DB server 120 may store, or facilitate the storage of, information that is accessible by the application server 115 so that the application server 115 may provide the services to the users 105. In one implementation, the DB server 120 may include a large amount of memory where the information may be stored. In another implementation, the DB server 120 may be implemented as logic that is communicatively coupled with large amounts of memory. As such, it will be recognized that access to the application server 115 by a user 105 to provide a service to the user 105 may include several transactions to be read from, or written to, the DB server or, more specifically, a central processing unit (CPU) or some other logic thereof.

The cloud-based resources 135 may additionally include one or more processors 125, and a machine learning module 130. As may be seen, the machine learning module 130 and/or the processor(s) 125 may be communicatively coupled with the DB server 120.

Generally, as noted, a high degree of access of the application server 115 and, subsequently, the DB server 120 may put a significant strain on the DB server 120 and, more particularly, one or more resources of the DB server 120. Similarly to the application server 115, such resources of the DB server 120 may include a processing unit (e.g., a CPU or some other processor or processor core), memory, a traffic control logic, and/or some other logic or resources of the DB server. In legacy implementations, such strain may have resulted in a user's 105 access to one or more of the cloud-based resources (e.g., a CPU of the DB server 120) becoming throttled. As used herein, "throttled" may refer to a limit being placed on the user's 105 access to the resource. In some cases, the limit may defined in terms of total bandwidth available in a given time period (e.g., per-second, per-minute, etc.), total number of transactions (e.g., read or write requests) in a given time period, and/or some other type of limit. In some implementations, such a limit may be pre-defined (e.g., a user 105 may always be throttled to a limit of x transactions per-minute). In other implementations, such a limit may be dynamic (e.g., a user 105 may be throttled to a limit of x % of the total transactions over a given time period, or x % of the user's 105 previous transactions over a given time period). It will be understood that this description of throttling provides some examples of how throttling may be implemented, and other implementations may implement throttling in a different manner, e.g., with respect to how throttling is performed, what the throttling level is, etc.

In some legacy implementations, such throttling may have been performed based on an ongoing analysis, where the decision to throttle was made based on the current state of the system and/or the current state of the user's 105 strain on the cloud-based resources 135. Once the decision was made, then the user's 105 access to the cloud-based resources 135 (e.g., a CPU of the DB server 120) may have been enacted. Such throttling may have occurred without a warning or notification to the user 105, thereby negatively impacting the user's 105 experience in accessing the cloud-based resources 135.

By contrast, implementations herein relate to a mechanism by which an impending throttling of the user's 105 access to the cloud-based resources 135 may be identified, and a warning may be provided to the user 105. The implementation described herein will be discussed with reference to a resource of the DB server 120, but it will be recognized that similar operations may be provided for access to other cloud-based resources.

In this implementation, the machine learning module 130 (which may also be referred to as "artificial intelligence," or "machine learning") may be coupled with the DB server 120. The machine learning module 130 may be referred to as a neural network, a gradient boosting machine, a regressive model, or some other type of machine learning-related network or implementation. Generally, it will be understood that the machine learning module 130 is depicted as separate from, but including, the historical data 140 and the predictive model 145. However, it will be recognized that this depiction is for the sake of discussion of implementations herein using a simplified block diagram, and the specific physical structure or implementation of the machine learning module 130, the historical data 140, and the predictive model 145 may be structured in a variety of configurations using hardware, software, firmware, and/or some combination thereof.

The machine learning module 130 may collect and/or maintain historical data 140 related to the usage of the DB server120 and/or one or more resources thereof. Such historical data 140 may include a number of fields or data points such as "time accessed," "workload," usage of a CPU of the DB server 120, the number of bytes written into or read from a given database, a number of sequential reads in a given database, an average number of active sessions at a given time, etc. It will be noted that these factors are intended as non-exhaustive examples of factors that may be used, and other implementations may use one or more additional or alternative factors.

Specifically, the fields or data points may relate to workload at a plurality of different times such that a pattern of the workload may be identified. The historical data 140 may relate to usage by a plurality of different users 105. The historical data 140 may be stored in a memory (e.g., a non-volatile memory) that is part of the machine learning module 130 (i.e., part of an electronic device that implements the machine learning module 130) or in a data storage device that is physically separate from, but communicatively coupled with, one or more electronic devices that include or implement the machine learning module 130. The historical data 140 may be saved in a table format, a database, or some other computer-readable format. The specific format and fields of the historical data 140 may be widely variable dependent on the specific implementation thereof.

Based on this historical data, the machine learning module 130 may be able to generate a predictive model 145 related to a user's 105 predicted future usage of the CPU of the DB server 120. In other words, if the user 105 has a pattern of use, then the predictive model 145 may be configured to predict the future usage of the CPU of the DB server 120 by the user based on the historical data 140. A specific example of such prediction is provided in FIGS. 2 and 3, as will be discussed in greater detail below.

The output of the prediction may be provided to a processor 125. As noted, in some implementations, the processor 125 may be part of the same electronic device, hardware, firmware, and/or software that implements the machine learning module 130. In other implementations, the processor 125 may be separate from the machine learning module 130. The processor 125 may be configured to provide, based on the predicted future usage of the CPU of the DB server 120 and prior to occurrence of the throttling, an indication to a user 105 that their access to the DB server 120 and/or the CPU of the DB server 120 will be throttled.

In some implementations, the decision to notify a user 105 that their access to the DB server 120, or resources thereof, may be throttled may be based on the predicted future usage exceeding a threshold usage value. In some cases, such a threshold may be based on an absolute value (e.g., above x transactions, using x % of the total resources of the DB server 120 and/or a resource thereof, etc.). In other cases, such a threshold may be based on a dynamic value (e.g., the user 120 is responsible for above x % of the total resource usage, etc.). In some cases, the identification that the user 120 will exceed the threshold may be measured over a given time period. For example, if the threshold is based on a prediction that the user may use greater than x % of the total resources of the DB server 120 and/or a resource thereof, the notification may only be triggered if such use is to occur for a specific time period (e.g., as may be measured in terms of seconds, minutes, tens of minutes, etc.). Such a time period may be desirable to allow for some degree of flexibility in the model such that a temporary spike will not result in an erroneous notification to the user 105.

In some implementations, the predictive model 145 may output a confidence factor related to the predicted usage. Such a confidence factor may be taken into account by the processor 125 when identifying whether to notify the user 105. For example, if the confidence factor is below a given value, then the notification may not be sent by the processor 125. This use of a confidence factor may likewise allow for some degree of flexibility in the model such that a temporary spike will not result in an erroneous notification to the user 105.

In some implementations, the processor 125 may be configured to perform the identification that the throttling is to occur. In this case, the processor 125 may make such an identification based on an indication provided by the machine learning module 130 regarding the predicted usage of the DB server120 or a resource thereof by the user 105. Based on this identification, the processor 125 may provide a notification to the user 105 that their access to the DB server120 or a resource of the DB server 120 will be throttled. In some cases, the processor 125 may further be communicatively coupled with the DB server120 such that the processor 125 may additionally control the occurrence of the throttling.

In another implementation, the machine learning module 130 may identify that the throttling is to occur. That is, the machine learning module 130 may include logic (not shown in FIG. 1) that is configured to receive and interpret the predicted usage provided by the predictive model 145. Based on the predicted usage of the resource of the DB server120 by a user 105, the logic may be configured to identify that the user's 105 access to the DB server120 and/or the resource of the DB server 120 will be throttled. The machine learning module 130 may then provide an indication to the processor 125 that a user's 105 access to the DB server120, or its resource, will be throttled, and the processor 125 may then provide a notification to the user 105 regarding the same.

It will be noted that, because the identification that throttling is to occur is based on a predicted usage, such notification may occur prior to the occurrence of the throttling. For example, the predicted usage may be a prediction that the throttling will occur in a given time period in the future (e.g., five minutes in the future). The processor 125 may then provide an indication to a user 105 that the user's 105 access to the DB server120 resource will be throttled at a time period in the future (i.e., to put it in colloquial terms, a message that tells the user 105 "Your access to this service may be throttled in five minutes.").

It will also be understood that, subsequent to the notification, the user's 105 usage of the DB server120 and/or the resource (e.g., the CPU) of the DB server 120 will continue to be monitored. As a result, if the user's 105 usage of the DB server120 resource decreases to an amount such that the usage is under the threshold value, then the throttling may not occur. However, if the user's 105 usage exceeds the threshold value, then the processor 125 (or some other logic) may throttle the user's access to the DB server120 and/or the resource of the DB server 120. In this way, the notification provided by the processor 125 may allow the user 105 to change their behavior prior to the occurrence of the throttling, such that the throttling may not occur.

Figure 2:
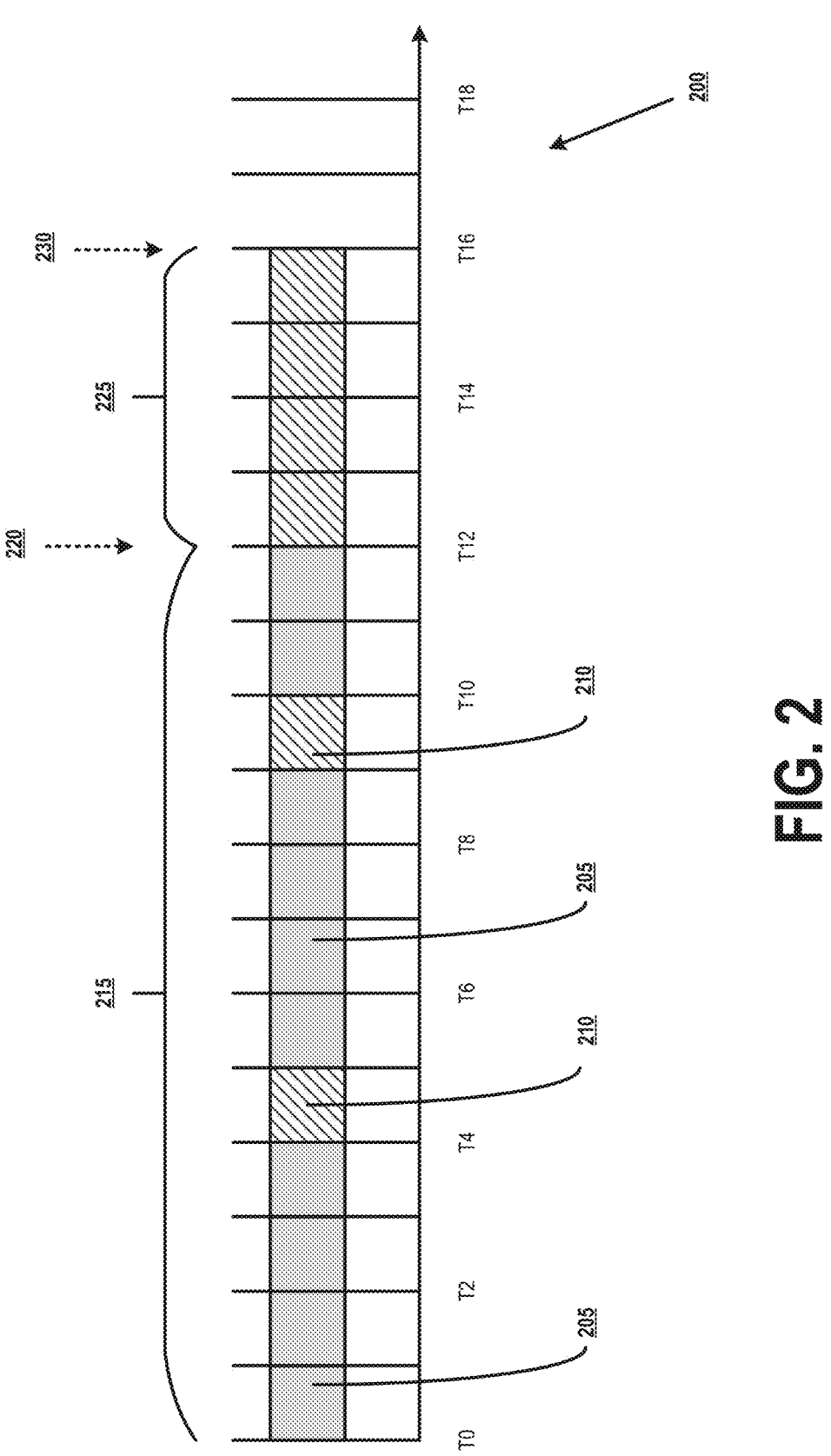
FIG. 2 depicts an example timeline related to usage of a cloud-based resource, in accordance with various implementations.

FIG. 2 depicts an example timeline 200 related to usage of a cloud-based resource (e.g., a CPU of the DB server120), in accordance with various implementations. Specifically, the X-axis of FIG. 2 may represent different time increments (T0-T18 and on). In this particular example, the time increments may be in units of minutes. In this example, the usage of the cloud-based resource may be the usage of the resource by a single user.

The timeline 200 depicts two degrees of "usage" by the user. Specifically, the solid-grey shaded blocks 205 may be time periods in which the user (e.g., user 105) has a "low" amount of usage of the CPU of the DB server120. The diagonally-striped blocks 210 may be time periods in which the user has a "high" amount of usage of the CPU of the DB server120. As described above, the terms "low" and "high" may be relative terms, and may be based on a dynamic or pre-defined limit as previously-described with respect to throttling. Specifically, "high" may be an amount of usage that is at or above the above-described limit and which may indicate that throttling may be desirable. Conversely, "low" may be an amount of usage that is at or below the above-described limit, and which may not mean that throttling is desirable.

The user's usage may be indicated at 215. Specifically, the user's usage may span from T0-T12. At T12 220, the machine learning module 130 and, more particularly, the predictive model 145 may identify, based on the usage at 215, that it is likely that a user's access to the CPU of the DB server120 may be throttled. For example, the predictive model 145 may predict that the user's usage during duration 225 (i.e., from T12-T16) may be a high amount of usage which may result in the user's access to the DB server being throttled at T16 230.

In some implementations, the user's usage that is analyzed/identified at 215 may be based on analysis of elements that are similar to those in the historical data 140 upon which the predictive model 145 is based. For example, the user's usage may be identified based on CPU usage of a DB server 120, the number of bytes written into or read from a given database, a number of sequential reads in a given database, an average number of active sessions at a given time, etc. As noted above, it will be understood that this list of factors is intended as a non-exhaustive list of example factors that may be used, and other factors may additionally or alternatively be used in other implementations.

Based on this prediction, a processor (e.g., processor 125) may notify the user at T12 220 that the user's access to the DB server and/or the CPU of the DB server 120 may be throttled. Subsequently, if the user continues to have a high amount of usage as shown at 215, then the user's access may be throttled at 230.

Figure 3:
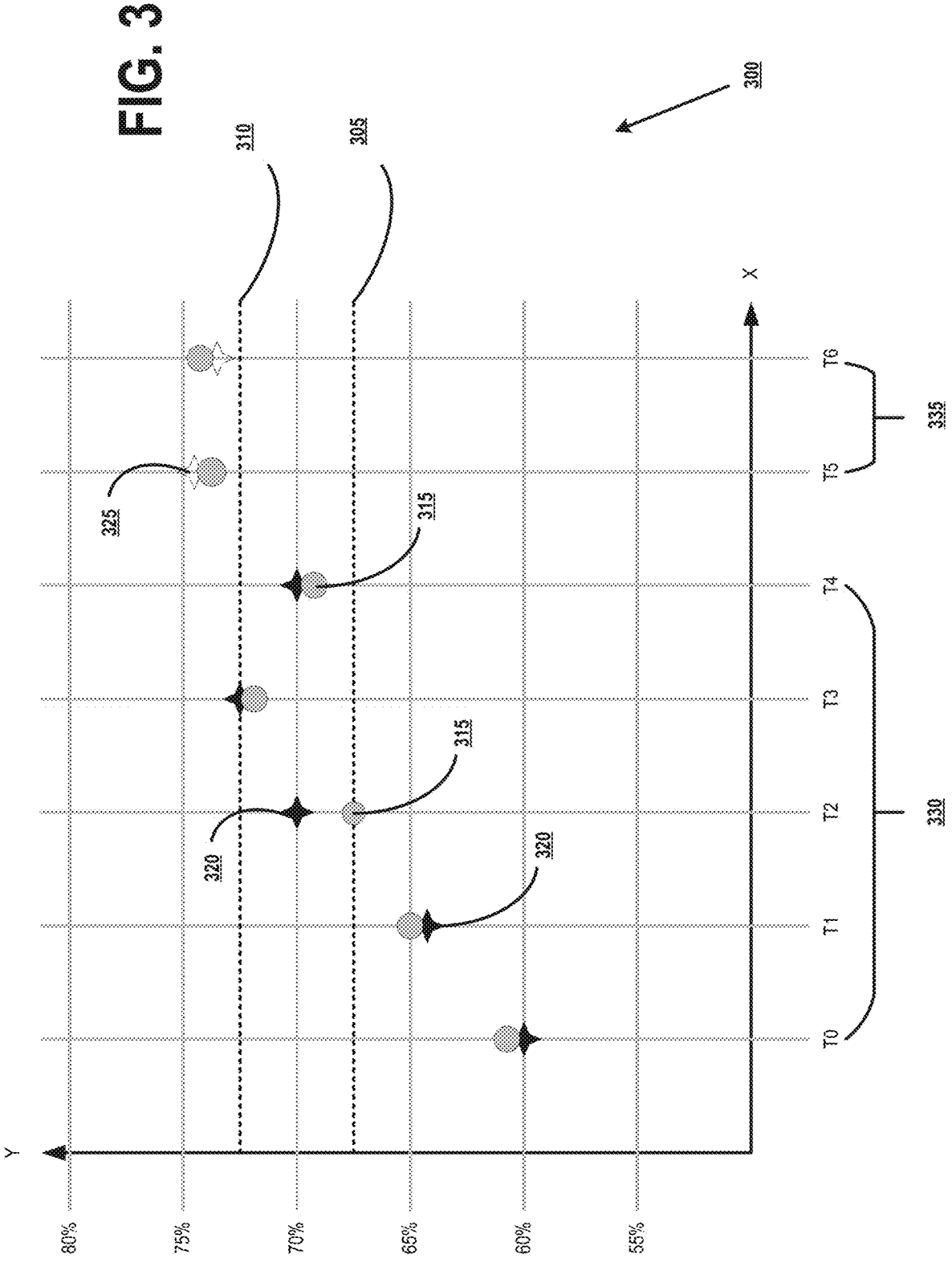
FIG. 3 depicts an example of the output of a predictive model related to usage of a cloud-based resource, in accordance with various implementations.

FIG. 3 depicts an example of the output of a predictive model related to usage of a cloud-based resource, in accordance with various implementations. Specifically, FIG. 3 may depict a graph 300 that shows an example of the output of predictive model 145 compared to real-world usage of a cloud-based resource such as the DB server120.

The Y-axis "Y" of the graph 300 may depict usage, in percentage of the CPU of the DB server120. The X-axis "X" of the graph 300 may depict time intervals T0-T6. Similarly to the timeline 200, the time intervals T0-T6 may be in intervals of minutes for the sake of this example, although, as described above, other implementations may measure the time intervals in terms of milliseconds, seconds, tens of minutes, hours, etc.

The graph 300 may further depict two threshold values 310. The threshold value 305 may be a usage threshold value at which usage of the predictive model 145 may be indicated. In other words, if the usage value is above threshold value 305, then use of the predictive model 145 may be indicated to analyze whether a user is at risk of throttling. The threshold value 310 may be the threshold value at which throttling may occur.

The time periods T0-T4 330 may be observed usage of the CPU of the DB server120 by a user 105. Specifically, the star-shaped points 320 relate to the observed usage of the CPU of the DB server120 by the user. The grey-circular points 315 may relate to the predictions made by the predictive model 145. As may be seen, the points 315 may generally track the points 320.

The time period 335 may relate to predictions made by the model based on the data in time period 330. Specifically, the points 315 in time period 335 may relate to usage predictions made by the predictive model based on the usage data 320 from time period 330. The outlined star-shaped points 325 in region 335 may be subsequent usage data that is compared against the predictions 315. As may be seen, the predictions 315 in time period 335 based on the usage data 320 in time period 330 may generally track the actual usage data 325 in time period 335. As such, a prediction of the user's usage in time period 335 may be a reliable prediction upon which to base a warning that the user's access to the DB server120 and/or the CPU of the DB server 120 may be at risk of being throttled.

FIG. 4 depicts an example process related to a cloud-based resource, in accordance with various implementations. Specifically, FIG. 4 may be implemented by one or more elements of the cloud-based resources 135 such as the processor(s) 125 and/or the machine learning module 130.

The process may include predicting, at 405 based on previous usage of a cloud-based computing resource by one or more users, future usage of the cloud-based computing resource. The cloud-based computing resource may be a CPU of a DB server such as DB server120 or some other type of cloud-based computing resource. The prediction may be performed by, for example, a machine learning module such as machine learning module 130 and, more specifically, the predictive model 145 of the machine learning module. The predicted future usage may be, for example, the predicted future usage of the cloud-based resource by a given user 105 such as the predicted future usage described with respect to element 225 that is based on the previous usage described with respect to element 215.

The process may further include identifying, at 410 based on the predicted future usage of the cloud-based computing resource, that throttling of access of the cloud-based computing resource is to occur. As described above, such identification may be performed by a processor such as processor 125 based on an output provided by the machine learning module 130. Alternatively, such identification may be performed by logic of the machine learning module 130.

The process may further include notifying, at 415 based on the identification that the throttling of access is to occur, a user of the one or more users that the throttling of access is to occur. Specifically, element 415 may be performed by a processor such as processor 125. As described above, the user that is notified may be the user whose usage is predicted to result in throttling.

FIG. 5 depicts an alternative example process related to a cloud-based resource, in accordance with various implementations. Specifically, FIG. 4 may be implemented by a machine learning module such as machine learning module 130.

The process may include identifying, at 505, a plurality of sets of data related to usage of a cloud-based computing resource. The sets of data may be, for example, the historical data 140. The cloud-based computing resource may be, for example, a CPU or some other resource of the DB server120. As previously described, the sets of data may include data related to usage of the CPU of the DB server120 at a plurality of time periods by a plurality of users.

The process may further include generating, at 510 based on the plurality of sets of data, a model configured to predict future usage of the cloud-based computing resource based on previous usage of the cloud-based computing resource. For example, the model may be the predictive model 145. The model may be configured to predict future usage (e.g., the usage described with respect to element 225) based on previous usage (e.g., the usage described with respect to element 215) of the cloud-based resource.

The process may further include facilitating, at 515 based on the model, a notification to a user of the cloud-based computing resource that throttling of access to the cloud-based computing resource is to occur based on the user's previous usage of the cloud-based computing resource. Such notification may be, for example, the notification described with respect to element 220. Specifically, the machine learning module 130 may facilitate such a notification by providing an indication to the processor 125 (either an indication of the predicted usage or an indication of throttling) as described above, and then the processor 125 may provide the notification.

Figure 6:
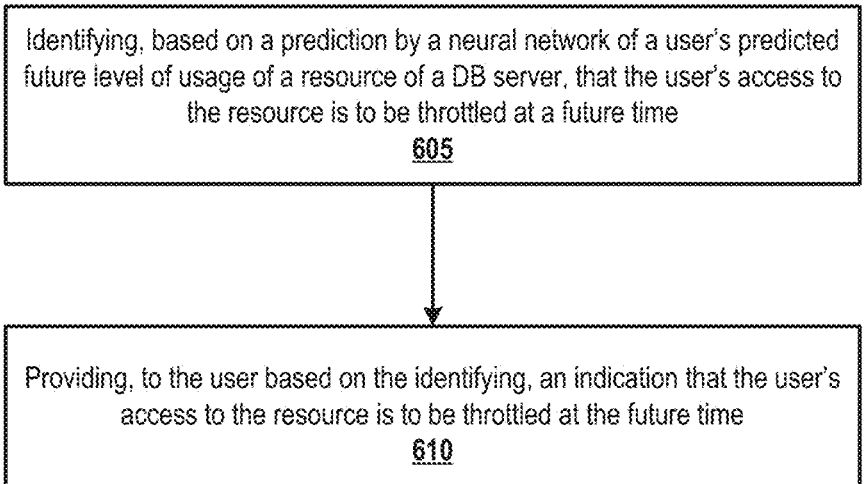
FIG. 6 depicts an alternative example process related to a cloud-based resource, in accordance with various implementations.

FIG. 6 depicts an alternative example process related to a cloud-based resource, in accordance with various implementations. The process of FIG. 6 may be performed by, for example, a processor such as processor 125.

The process may include identifying, at 605 based on a prediction by a machine learning module 130 of a user's 105 predicted future level of usage of a resource of the DB server120, that the user's 105 access to the resource is to be throttled at a future time. Specifically, the processor 125 may make such an identification based on an indication provided by the machine learning module 130 of the predicted level of usage and/or an indication provided by the machine learning module 130 that the machine learning module 130 identified that the user's 105 access may be throttled.

The process may further include providing, at 610 to the user 105 based on the identifying, an indication that the user's access to the resource is to be throttled at the future time (e.g., the time T16 at 230). As previously described, such notification may be transmitted at time T12 220.

It will be understood that the above described processes of FIGS. 4-6 are intended as highly simplified examples of such processes, and other implementations may include more or fewer elements, elements arranged in a different order than depicted or discussed, etc.

Example Electronic Devices and Environments

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

As used herein, the term "user" refers to an entity (e.g., an individual person, a company, a school, a floor of a building, a department, etc.) that uses one or more electronic devices. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 7A:
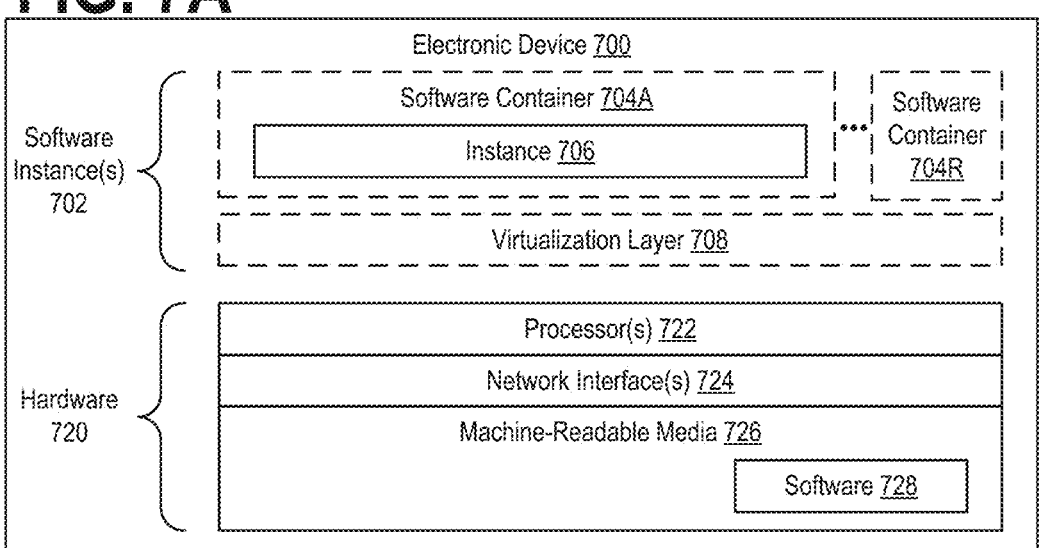
FIG. 7A is a block diagram illustrating an electronic device according to some example implementations.

FIG. 7A is a block diagram illustrating an electronic device 700 according to some example implementations. FIG. 7A includes hardware 720 comprising a set of one or more processor(s) 722, a set of one or more network interfaces 724 (wireless and/or wired), and machine-readable media 726 having stored therein software 728 (which includes instructions executable by the set of one or more processor(s) 722). The machine-readable media 326 may include non-transitory and/or transitory machine-readable media. Each of the previously described clients and the cloud-based services (e.g., access to the DB server or some other service) may be implemented in one or more electronic devices 700 as described above. In one implementation: 1)

each of the clients is implemented in a separate one of the electronic devices 700 (e.g., in end user devices where the software 728 represents the software to implement clients to interface directly and/or indirectly with the cloud-based service (e.g., software 728 represents a web browser, a native client, a portal, a command-line interface, and/or an application programming interface (API) based upon protocols such as Simple Object Access Protocol (SOAP), Representational State Transfer (REST), etc.)); 2) the cloud-based service is implemented in a separate set of one or more of the electronic devices 700 (e.g., a set of one or more server devices where the software 728 represents the software to implement the cloud-based service); and 3) in operation, the electronic devices implementing the clients and the cloud-based service would be communicatively coupled (e.g., by a network) and would establish between them (or through one or more other layers and/or or other services) connections for submitting, for example, requests for access to one or more elements of the cloud-based resources 135 such as a service of the application server 115 and/or the DB server120) to the cloud-based service and returning information regarding such a service to the clients. Other configurations of electronic devices may be used in other implementations (e.g., an implementation in which the client and the cloud-based service are implemented on a single one of electronic device 700).

During operation, an instance of the software 728 (illustrated as instance 706 and referred to as a software instance; and in the more specific case of an application, as an application instance) is executed. In electronic devices that use compute virtualization, the set of one or more processor(s) 722 typically execute software to instantiate a virtualization layer 708 and one or more software container(s) 704A-304R (e.g., with operating system-level virtualization, the virtualization layer 708 may represent a container engine (such as Docker Engine by Docker, Inc. or rkt in Container Linux by Red Hat, Inc.) running on top of (or integrated into) an operating system, and it allows for the creation of multiple software containers 704A-304R (representing separate user space instances and also called virtualization engines, virtual private servers, or jails) that may each be used to execute a set of one or more applications; with full virtualization, the virtualization layer 708 represents a hypervisor (sometimes referred to as a virtual machine monitor (VMM)) or a hypervisor executing on top of a host operating system, and the software containers 704A-304R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 728 is executed within the software container 704A on the virtualization layer 708. In electronic devices where compute virtualization is not used, the instance 706 on top of a host operating system is executed on the "bare metal" electronic device 700. The instantiation of the instance 706, as well as the virtualization layer 708 and software containers 704A-304R if implemented, are collectively referred to as software instance(s) 702.

Alternative implementations of an electronic device may have numerous variations from that described above. For example, customized hardware and/or accelerators might also be used in an electronic device.

Example Environment

Figure 7B:
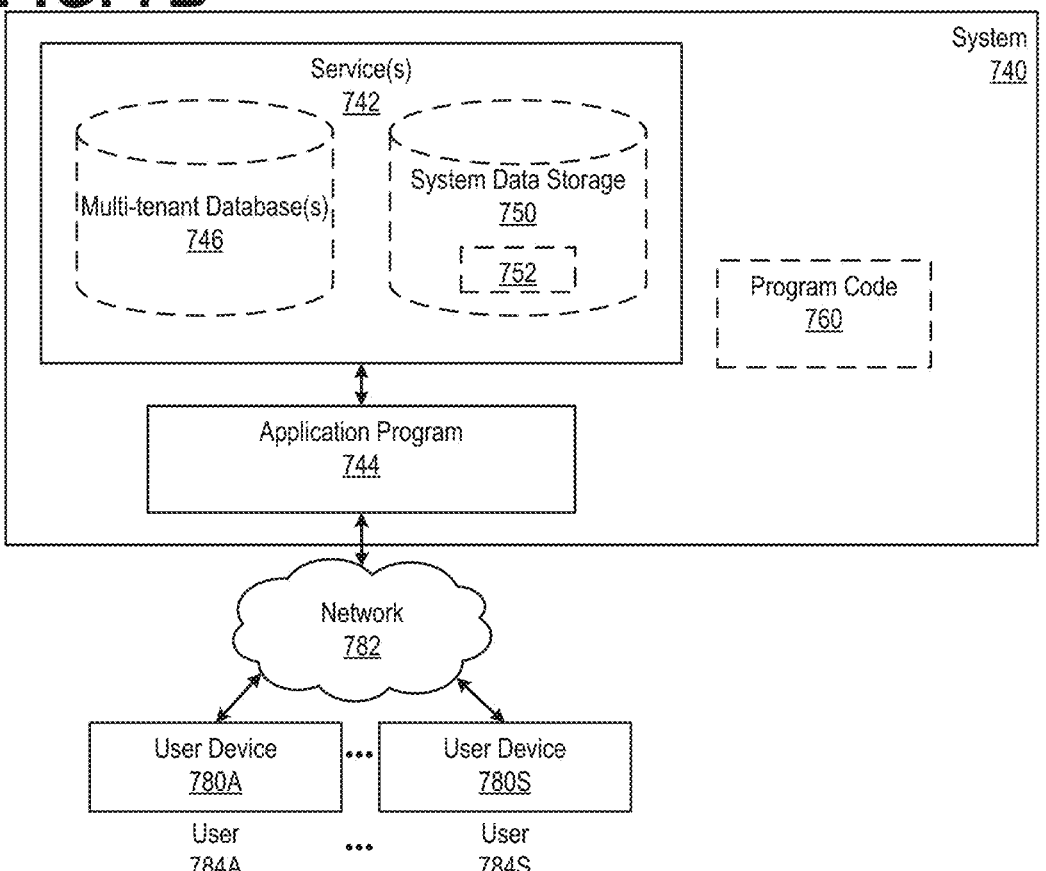
FIG. 7B is a block diagram of a deployment environment according to some example implementations.

FIG. 7B is a block diagram of a deployment environment according to some example implementations. A system 740 (which may be similar to, for example, the cloud-based resources 135) includes hardware (e.g., a set of one or more server devices) and software to provide service(s) 742, including the cloud-based service. In some implementations the system 740 is in one or more datacenter(s). These datacenter(s) may be: 1) first party datacenter(s), which are datacenter(s) owned and/or operated by the same entity that provides and/or operates some or all of the software that provides the service(s) 742; and/or 2) third-party datacenter(s), which are datacenter(s) owned and/or operated by one or more different entities than the entity that provides the service(s) 742 (e.g., the different entities may host some or all of the software provided and/or operated by the entity that provides the service(s) 742). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 740 is coupled to user devices 780A-780S (which may be similar to the user(s) 105 described with respect to FIG. 1) over a network 782 (which may be similar to the cloud 110 of FIG. 1). The service(s) 742 may be on-demand services that are made available to one or more of the users 784A-784S working for one or more entities other than the entity which owns and/or operates the on-demand services (those users sometimes referred to as outside users) so that those entities need not be concerned with building and/or maintaining a system, but instead may make use of the service(s) 742 when needed (e.g., when needed by the users 784A-784S). The service(s) 742 may communicate with each other and/or with one or more of the user devices 780A-780S via one or more APIs (e.g., a REST API). In some implementations, the user devices 780A-780S are operated by users 784A-784S, and each may be operated as a client device and/or a server device. In some implementations, one or more of the user devices 780A-780S are separate ones of the electronic device 700 or include one or more features of the electronic device 700.

In some implementations, the system 740 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 740 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 740 may include an application platform 744 that enables PAAS for creating, managing, and executing one or more applications developed by the provider of the application platform 744, users accessing the system 740 via one or more of user devices 780A-780S, or third-party application developers accessing the system 740 via one or more of user devices 780A-780S.

In some implementations, one or more of the service(s) 742 may use one or more multi-tenant databases 746, as well as system data storage 750 for system data 752 accessible to system 740. One or both of the multi-tenant databases 746 and the system data storage 750 may be or include the DB server 120. In certain implementations, the system 740 includes a set of one or more servers that are running on server electronic devices and that are configured to handle requests for any authorized user associated with any tenant (there is no server affinity for a user and/or tenant to a specific server). The user devices 780A-780S communicate with the server(s) of system 740 to request and update tenant-level data and system-level data hosted by system 740, and in response the system 740 (e.g., one or more servers in system 740) automatically may generate one or more Structured Query Language (SQL) statements (e.g., one or more SQL queries) that are designed to access the desired information from the multi-tenant database(s) 746 and/or system data storage 750.

In some implementations, the service(s) 742 are implemented using virtual applications dynamically created at run time responsive to queries from the user devices 780A-780S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 760 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 744 includes an application setup mechanism that supports application developers' creation and management of applications, which may be saved as metadata by save routines. Invocations to such applications, including the XYZ service, may be coded using Procedural Language/ Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 782 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4th generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 740 and the user devices 780A-780S.

Each user device 780A-780S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 740. For example, the user interface device can be used to access data and applications hosted by system 740, and to perform searches on stored data, and otherwise allow one or more of users 784A-784S to interact with various GUI pages that may be presented to the one or more of users 784A-784S. User devices 780A-780S might communicate with system 740 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 780A-780S might include an HTTP client, commonly referred to as a "browser," for sending and receiving HTTP messages to and from server(s) of system 740, thus allowing users 784A-784S of the user devices 780A-780S to access, process and view information, pages and applications available to it from system 740 over network 782.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. One or more non-transitory machine-readable storage media having program instructions stored thereon that are capable of causing a computer system to perform operations comprising:

detecting that a first current usage of a cloud-based computing resource by a user of one or more users that utilize the cloud-based computing resource satisfies an initial threshold;

based on the detecting that the first current usage satisfies the initial threshold, predicting, using a neural network and based on previous usage of the cloud-based computing resource by the user, future usage of the cloud-based computing resource by the user;

identifying, based on the predicted future usage of the cloud-based computing resource satisfying a throttle threshold for a first period of time, that throttling of the user's access to the cloud-based computing resource is to occur; and before the throttling of the user's access, notifying the user that the throttling is to occur; and after the notifying the user and based on a detection that a second current usage of the cloud-based computing resource by the user satisfies the throttle threshold for the first period of time, throttling the user's access to the cloud-based computing resource by limiting a number of requests processed for the user within a second period of time.

2. The one or more non-transitory machine-readable storage media of claim 1, wherein the cloud-based computing resource is a resource of a database (DB) server.

3. The one or more non-transitory machine-readable storage media of claim 1, wherein the throttle threshold is a pre-defined threshold.

4. The one or more non-transitory machine-readable storage media of claim 1, wherein the throttle threshold is a dynamic threshold.

5. The one or more non-transitory machine-readable storage media of claim 1, wherein the throttle threshold is a dynamic value related to a future level of usage of the resource by a plurality of users that includes the user.

6. The one or more non-transitory machine-readable storage media of claim 1, wherein the throttle threshold is based on a comparison of the user's predicted future usage to a predicted total usage by a plurality of users that includes the user.

7. An article of manufacture comprising:

one or more processors operable to implement a neural network; and a non-transitory machine-readable storage medium having program instructions stored thereon that are executable by the one or more processors to perform operations comprising:

identifying a plurality of sets of data related to usage of a cloud-based computing resource, wherein a set of data of the plurality of sets of data includes:

an indication of an amount of usage of the cloud-based computing resource at a first historical time; and an indication of an amount of usage of the cloud-based computing resource at a second historical time that is after the first historical time;

generating, based on the plurality of sets of data, a model configured to predict future usage of the cloud-based computing resource based on previous usage of the cloud-based computing resource; and detecting that a first current usage of the cloud-based computing resource by a user satisfies an initial threshold;

based on the detecting that the first current usage satisfies the initial threshold, predicting, using the model and based on previous usage of the cloud-based computing resource by the user, future usage of the cloud-based computing resource by the user;

identifying, based on the predicted future usage by the user satisfying a throttle threshold for a first period of time, that throttling of the user's access to the cloud-based computing resource is to occur; and before the throttling of the user's access, notifying the user that the throttling is to occur; and after the notifying the user and based on a detection that a second current usage of the cloud-based computing resource by the user satisfies the throttle threshold for the first period of time, throttling the user's access to the cloud-based computing resource by limiting a number of requests processed for the user within a second period of time.

8. The article of claim 7, wherein the cloud-based computing resource is a resource of a database (DB) server.

9. The article of claim 7, wherein the throttle threshold is a pre-defined threshold.

10. The article of claim 7, wherein the throttle threshold is a dynamic threshold.

11. The article of claim 7, wherein the throttle threshold is a dynamic value related to a future level of usage of the resource by a plurality of users that includes the user.

12. The article of claim 7, wherein the throttle threshold is based on a comparison of the user's predicted future usage to a predicted total usage by a plurality of users that includes the user.

13. An electronic device comprising:

one more processors; and one or more non-transitory machine-readable storage medium having program instructions stored thereon that are executable by the one or more processors to cause the electronic device to perform operations comprising:

detecting that a first current usage of a resource of a database server by a user satisfies an initial threshold;

based on the detecting that the first current usage satisfies the initial threshold, predicting, using a neural network and based on previous usage of the resource by the user, future usage of the resource by the user;

identifying, based on the predicted future usage satisfying a throttle threshold for a first period of time, that the user's access to the resource is to be throttled at a future time;

providing, to the user based on the identifying, an indication that the user's access to the resource is to be throttled at the future time; and after the providing of the indication to the user and based on a detection that a second current usage of the resource by the user satisfies the throttle threshold at the future time, throttling the user's access to the resource by limiting a number of requests processed for the user within a period of time.

14. The electronic device of claim 13, wherein the throttle threshold is a pre-defined value.

15. The electronic device of claim 13, wherein the throttle threshold is based on a comparison of the user's predicted future usage to total usage capacity of the resource.

16. The electronic device of claim 13, wherein the throttle threshold is a dynamic value related to a future level of usage of the resource by a plurality of users that includes the user.

17. The electronic device of claim 13, wherein the throttle threshold is based on a comparison of the user's predicted future usage to a predicted total usage by a plurality of users that includes the user.

* * * * *